May 14, 1957

C. G. WILLIS 2,791,979

UNDERWATER CABLE

Filed Oct. 18, 1952

CORNELIUS G. WILLIS
INVENTOR.

BY *Lyon & Lyon*

ATTORNEYS

United States Patent Office 2,791,979
Patented May 14, 1957

2,791,979

UNDERWATER CABLE

Cornelius G. Willis, Los Angeles, Calif.

Application October 18, 1952, Serial No. 315,514

2 Claims. (Cl. 114—0.5)

This invention relates to anchoring cables for underwater use, and is particularly directed to an improved form of cable for anchoring a floating member in a body of water.

Anchoring cables of conventional type used in anchoring floating devices, such as barges, usually have a considerable sag, and this is often objectionable because it allows the barge or other floating device to shift laterally with the tides, currents, winds or wave action. The lower end of the cable is conventionally attached to a suitable anchor device, and the upper end is secured to the floating device. It has been heretofore proposed to eliminate the objectionable sagging by employing buoys at intervals along the length of the anchoring cable in order to minimize the sag of the cable. The proposed series of buoys has the disadvantage of requiring a great many buoys along the anchoring cable with attendant expense of initial installation and maintenance.

In accordance with my invention, I provide a novel form of anchoring cable which eliminates the requirement of buoys and yet which is capable of operation with little or no sagging effect. I accomplish this result by enclosing a conventional stranded steel cable within a relatively thick coating or sheath formed of a protective material. The specific gravity of the protective material employed is less than the specific gravity of water or sea water. The thickness of the enclosing sheath is made sufficiently great so that the specific gravity of the sheathed cable as a whole is approximately that of water or sea water.

Accordingly, it is the principal object of my invention to provide a novel form of cable for underwater use which has substantially the same density as the medium in which it is to be employed. A more particular object is to provide a stranded steel cable enclosed within a coating or sheath of material having a density less than that of water. Another object is to provide such a cable unit in which the enclosing sheath is formed of material which is relatively impervious to attack by sea water. Other and more detailed specifications and advantages will appear here and after.

Figure 1:
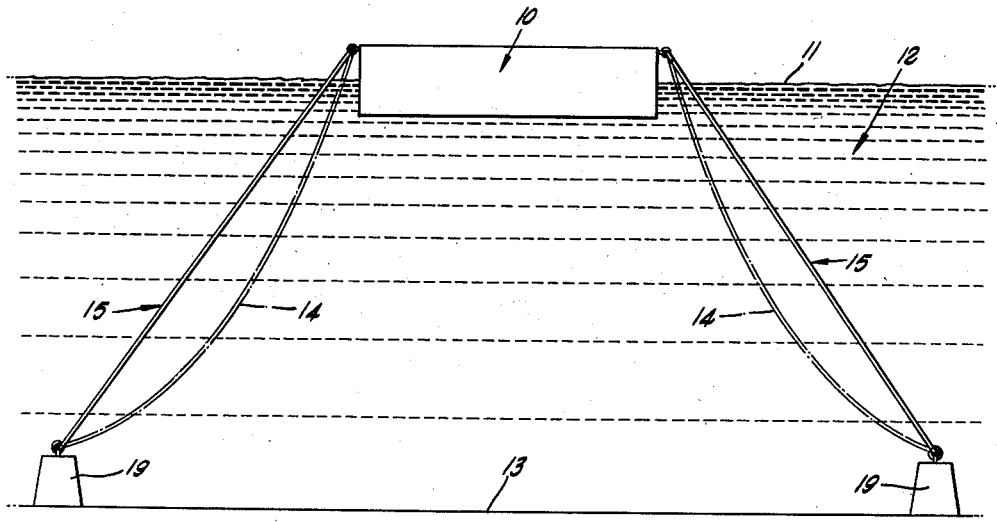
Figure 2:
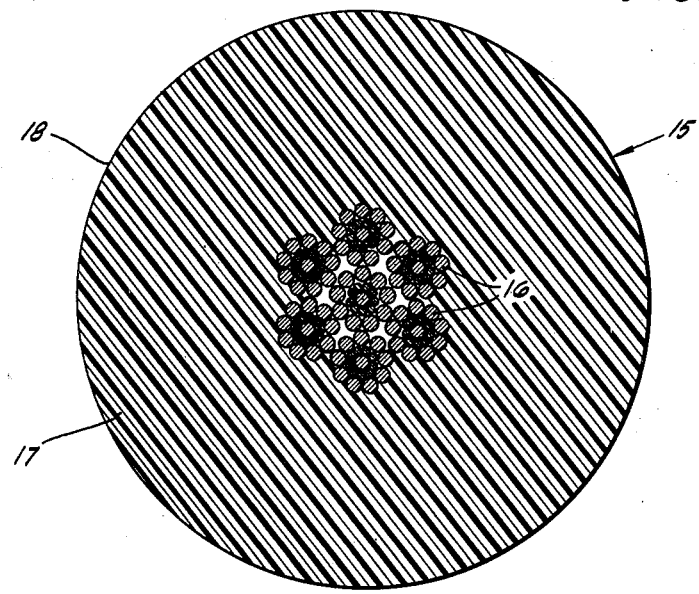

In the drawings Figure 1 is a diagrammatic illustration showing a floating barge held against lateral movement by means of anchoring cables extending to submerged anchor devices. Figure 2 is a cross section of a preferred form of cable unit embodying my invention.

Referring to the drawings, the floating device 10 may comprise a barge, an aircraft landing field, a well drilling support, a dock, or any other floating object. The device 10 may float at its natural level of buoyancy with respect to surface 11 with a body of water 12, or it may be maintained at a lower level of submergence by means of holddown cables (not shown) extending to the floor 13 of the body of water 12. Anchoring cables 14 of conventional type are shown in phantom lines connecting the floating device 10 to the anchor device 15 resting on the bottom 13. The anchoring cables 14 have considerable sag because of the difference in density of the steel cable and the water in which they are positioned.

In accordance with my invention I eliminate the sag in the conventional cables 14 by employing in their stead cables 15 shown in solid lines. Cables 15 do not sag because they are substantially the same density as the water in which they are situated. As shown in Figure 2, each of the cables 15 comprises a core 16 of conventional stranded steel cable. This core 16 is enclosed within a relatively thick sheath 17 of material which protects the steel cables from undesirable chemical attack by substances present in the body of water. I prefer to employ plastic materials for the sheath 17 and to aerate and lighten the material by forming it with myriad quantities of small air bubbles. The sheath is made sufficiently thick so that the specific gravity of the cable unit, including both core 16 and sheath 17, is substantially equal to the water or sea water in which the cable is to be used. Any one of a number of commercially available plastic materials may be used such as, for example, aerated or cellular polystyrene. Such a material is marketed under the name "Styrofoam" by the Dow Chemical Company of Midland, Michigan. The air bubbles or gas bubbles in the plastic material do not intercommunicate and therefore only the bubbles which happen to be on the outer periphery 18 of the sheath contain any water.

Having fully described my invention, it is to be understood that I am not to be limited to the details herein set forth but that my invention is of the full scope of the appended claims.

I claim:

1. In combination with a floating structure located in a body of water, an inclined anchoring cable positioned within the body of water, the upper end of the anchoring cable being secured to said structure and the lower end being secured to a fixed object, the anchoring cable comprising a metal core having a specific gravity greater than water and a plastic sheath enclosing the core having a specific gravity less than water, the thickness of the sheath being sufficiently great so that the specific gravity of the combined core and sheath is substantially the same as water, whereby the anchoring cable extends in a straight line substantially without sagging nor arching.

2. In combination with a floating structure located in a body of water, an inclined anchoring cable positioned within the body of water, the upper end of the anchoring cable being secured to said structure and the lower end being secured to a fixed object, the anchoring cable comprising a stranded steel core enclosed within a relatively thick cellular plastic sheath, the thickness of the sheath being sufficiently great so that the combined specific gravity of the sheath and stranded steel core is substantially equal to that of water, whereby the anchoring cable extends in a straight line substantially without sagging nor arching.

References Cited in the file of this patent

UNITED STATES PATENTS

| | | |
|---|---|---|
| 2,231,869 | Andrews | Feb. 18, 1941 |
| 2,372,142 | Warren | Mar. 20, 1945 |
| 2,399,656 | Armstrong | May 7, 1946 |
| 2,419,053 | Bennett | Apr. 15, 1947 |
| 2,419,054 | Bennett | Apr. 15, 1947 |
| 2,549,777 | Craig | Apr. 24, 1951 |
| 2,561,487 | Bailhe | July 24, 1951 |
| 2,577,077 | Forsberg | Dec. 4, 1951 |
| 2,652,550 | Lash | Sept. 15, 1953 |

FOREIGN PATENTS

| | | |
|---|---|---|
| 275,327 | Great Britain | Aug. 4, 1927 |
| 556,747 | Great Britain | Oct. 20, 1943 |
| 557,442 | Great Britain | Nov. 19, 1943 |
| 707,631 | Germany | June 27, 1941 |